US010988234B2

(12) United States Patent
Klettke

(10) Patent No.: US 10,988,234 B2
(45) Date of Patent: Apr. 27, 2021

(54) AIRCRAFT HAVING HYDRAULIC SUPPORT STRUTS BETWEEN FUSELAGE AND WINGS

(71) Applicant: Airbus Operations GmbH, Hamburg (DE)

(72) Inventor: Marcus Klettke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1010 days.

(21) Appl. No.: 15/455,724

(22) Filed: Mar. 10, 2017

(65) Prior Publication Data
US 2017/0247103 A1 Aug. 31, 2017

Related U.S. Application Data

(63) Continuation of application No. PCT/EP2015/070624, filed on Sep. 9, 2015.

(30) Foreign Application Priority Data

Sep. 12, 2014 (DE) .................. 10 2014 113 218

(51) Int. Cl.
B64C 3/38 (2006.01)
B64C 1/26 (2006.01)
B64D 41/00 (2006.01)
F15B 11/10 (2006.01)

(52) U.S. Cl.
CPC ................ B64C 3/38 (2013.01); B64C 1/26 (2013.01); B64D 41/00 (2013.01); F15B 11/10 (2013.01); F15B 2211/40 (2013.01)

(58) Field of Classification Search
CPC ............... B64C 3/38; B64C 1/26; F15B 11/10
See application file for complete search history.

(56) References Cited

U.S. PATENT DOCUMENTS 1,783,529 A * 12/1930 Waterman ............... B64C 3/385
244/76 R
2,186,558 A * 1/1940 Rouanet .................... B64C 1/26
244/38
2,603,435 A * 7/1952 Metzler ..................... B64C 1/26
244/38

(Continued)

FOREIGN PATENT DOCUMENTS

CN 102498002 A 6/2012
DE 483040 A 9/1929

(Continued)

OTHER PUBLICATIONS

Chinese Office Action and Search Report for Chinese Application No. 20150052284.1 dated Jul. 2, 2018.

(Continued)

Primary Examiner — Brian M O'Hara
Assistant Examiner — Keith L Dixon
(74) Attorney, Agent, or Firm — Jenkins, Wilson, Taylor & Hunt, P.A.

(57) ABSTRACT

An aircraft with a fuselage and with wings connected thereto, wherein a support strut extends between the fuselage and each of the wings, which support strut is connected both to the fuselage and to the wing. The support strut has a hydraulic working cylinder, which can be pressurized with hydraulic fluid in a controlled manner for the purpose of pivoting the wing.

6 Claims, 1 Drawing Sheet

(56) References Cited

U.S. PATENT DOCUMENTS

| | | | |
|---|---|---|---|
| 5,078,338 A | | 1/1992 | O'Neill et al. |
| 5,645,250 A | * | 7/1997 | Gevers .................. B64C 35/008 244/101 |
| 5,915,650 A | * | 6/1999 | Petrovich .................. B64C 3/38 244/46 |
| 9,597,939 B2 | | 3/2017 | Anderson et al. |
| 2010/0059623 A1 | | 3/2010 | Cazals et al. |

FOREIGN PATENT DOCUMENTS

| | | |
|---|---|---|
| DE | 525387 C | 10/1931 |
| DE | 907502 B | 3/1954 |
| FR | 421352 A | 2/1911 |

OTHER PUBLICATIONS

Chinese Office Action for Application No. 201580052284.1 dated Mar. 4, 2019.
English Translation of the IPRP with Written Opinion for Application No. PCT/EP2015/070624 dated Mar. 14, 2017.
German Search Report for Application No. 102014113218 dated Mar. 30, 2015.
International Search Report for Application No. PCT/EP2015/070624 dated Nov. 5, 2015.

\* cited by examiner

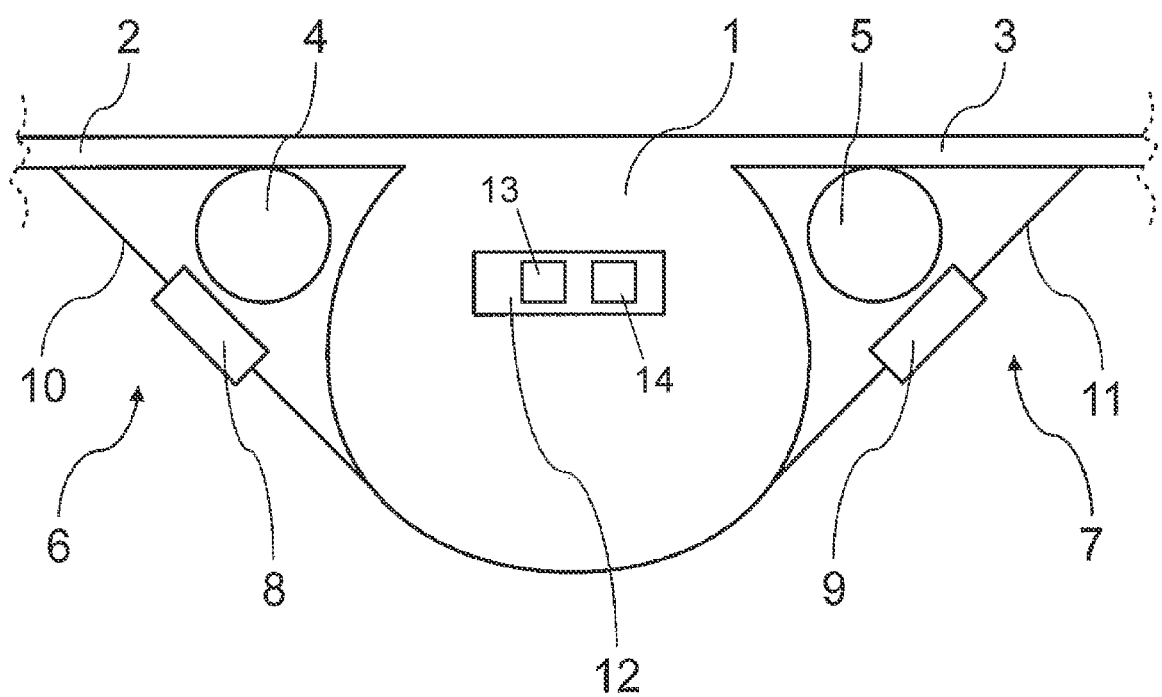

AIRCRAFT HAVING HYDRAULIC SUPPORT STRUTS BETWEEN FUSELAGE AND WINGS

CROSS-REFERENCE TO RELATED APPLICATIONS

This application is a continuation of International Application No. PCT/EP2015/070624 filed Sep. 9, 2015, which claims priority to German Patent Application No. 10 2014 113 218.1 filed Sep. 12, 2014, the entire disclosures of which are incorporated by reference herein.

TECHNICAL FIELD

The disclosure herein relates to an aircraft with a fuselage and with wings connected thereto, wherein a support strut extends between the fuselage and each of the wings, which support strut is connected both to the fuselage and to the wing.

BACKGROUND

Concepts for aircraft are known which are to be entirely or partially electrically powered (e.g., Boeing SUGAR Volt), where support struts are provided between the fuselage and wings because the wings have a considerable wingspan and require support.

A problem addressed by the disclosure herein is to form an aircraft in such a way that the provided support struts, in addition to supporting the respective wing, have additional functions with respect to the fuselage.

In order to solve this problem, an aircraft of the type mentioned above is formed according to the disclosure herein such that the support strut has a hydraulic working cylinder, which can be pressurized with hydraulic fluid in a controlled manner for the purpose of pivoting the wing.

Pressurizing the working cylinder with hydraulic fluid changes its length and thus also the position of the wing relative to the aircraft fuselage. A simultaneous or synchronous adjustment of the working cylinders by the same amounts produces a simultaneous corresponding adjustment of the wing positions, which allows the wing assembly to be adapted to a variety of different fueling and loading situations. This adaptation can take place both before take-off of the aircraft and during the flight.

It is also possible to differently or asynchronously pressurize the working cylinders with hydraulic fluid, so that the wings are displaced differently and a rolling motion of the aircraft is produced which is otherwise usually generated by ailerons.

SUMMARY

In one preferred embodiment of the disclosure herein, the cylinder body of the working cylinder is connected to the fuselage, and the piston of the working cylinder can be connected to a section of a support strut which extends to the wing, or, in the case of sufficient piston length, to the wing. It is also possible to fixedly attach the cylinder of the working cylinder to the fuselage and to connect the free end of the piston rod to the end of the support strut which is close to the fuselage via a swiveling lever.

During normal flight, vibrations or oscillations are produced, which act on the working cylinders of the support struts and bring about shifting of the piston. These shifting movements occur more or less rapidly depending on the resistance which works against the shifting of hydraulic fluid in the working cylinder. In one preferred embodiment of the disclosure herein, the valves lying in the flow path of the hydraulic fluid can be controlled such that the flow resistance of the hydraulic fluid is adjustable. The wings can thus be adjusted to be more flexible or more rigid.

In another embodiment of the disclosure herein, the respective working cylinder is coupled with a hydraulic motor and an electric motor/generator, so that the piston movement caused during flight by wing vibrations or wing oscillations drives the hydraulic motor and thus the motor/generator.

Such a construction is known as so-called GenShock technology for automobile suspension. The application in an aircraft according to the disclosure herein allows electricity to be generated from the piston movements produced by the wing vibrations or wing oscillations when the motor/generator functions as a generator. This electricity can be stored and used for operating the aircraft.

Since significant importance is placed on obtaining weight reductions in aircraft, lightweight-construction working cylinders are preferably used according to the invention, for example, working cylinders with cylinders comprising or consisting of fiber-reinforced plastic, of the sort produced by Parker Hannifin Corp., Cleveland, Ohio, U.S.A., for example.

BRIEF DESCRIPTION OF THE DRAWINGS

The disclosure herein is explained in greater detail below with reference to the greatly simplified schematic diagram of FIG. 1 showing an exemplary embodiment.

DETAILED DESCRIPTION

The depicted aircraft has a fuselage 1 and wings 2, 3, to which propulsion units 4, 5 are usually attached. A support strut 6 extends between the fuselage 1 and the wing 2 and a support strut 7 extends between the fuselage 1 and the wing 3, both of which support struts are identically constructed. Each of the support struts 6, 7 comprises a hydraulic working cylinder, the cylinder body 8, 9 of which is attached to the fuselage 1, while its piston rod 10, 11 is connected to the wings 2, 3. The entire piston rod 10, 11 can extend to the wing 2, 3 or it can be connected to a strut section which is attached to the wing 2, 3.

The hydraulic working cylinders 8, 10 and 9, 11 are each connected to a source of hydraulic fluid in a manner which is not depicted. This source can be part of a unit 12, which is housed at a suitable location in the fuselage 1 of the aircraft. This unit 12 comprises, in addition to the hydraulic fluid sources for the working cylinders 8, 10 and 9, 11, a hydraulic motor 13 and an electric motor/generator 14 for each of the working cylinders as well as corresponding control devices. These permit an activation of the electric motors/generators 14 in order to drive the hydraulic motors 13, which then supply hydraulic fluid to the working cylinders 8, 10 and 9, 11 or withdraw hydraulic fluid from them by suction.

The sources of hydraulic fluid, the hydraulic motors 13 and the electric motors/generators 14 can of course also be individually housed in the fuselage instead of the hydraulic motors 13 and the electric motors/generators 14 being grouped together in a unit.

If the electric motors/generators 14 are simultaneously activated at the same speed, the pistons of the working cylinders 8, 10 and 9, 11 are displaced correspondingly and both wings 2, 3 are thus either raised or lowered. An adaptation to fueling and loading states is thus obtained which enhances the efficiency of the aircraft.

If the electric motors/generators 14 are activated in such that one of the working cylinders is supplied with more and the other working cylinder with less or no hydraulic fluid, then one wing is pivoted more and the other wing is pivoted less or not at all. This leads to a rolling motion of the aircraft, of the sort usually generated by the aileron.

In this regard it is noted that an adjustment of the "rigidity" of the wings 2, 3 can also be realized by the hydraulic working cylinders 8, 9. For this purpose, the resistance of the hydraulic fluid to displacement in the cylinder 8, 9 is able to be changed, for example, by adjustable valves. The forces which, by wing vibrations and wing oscillations, act on the piston of the working cylinder 8, 10 and 9, 11 and which produce a displacement of hydraulic fluid, can then more or less easily shift the hydraulic fluid and thus the respective piston dependent on the set flow resistance of the hydraulic fluid, so that the wing is adjusted to be more flexible or more rigid. A more flexible wing adjustment increases the cabin comfort during turbulence for example.

Finally, it is also possible to use the piston movements resulting from wing vibrations and wing oscillations to supply hydraulic fluid to the corresponding hydraulic motor 13 and to use the thus obtained driving of the hydraulic motor 13 to drive the electric motor/generator 14, so that it functions as a generator and generates electricity, which can be used for operating the aircraft.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a fuselage;
wings connected to the fuselage;
support struts, which extend between, and are connected to, the fuselage and a corresponding one of the wings, wherein each support strut comprises a hydraulic working cylinder, which can be pressurized with hydraulic fluid in a controlled manner for pivoting the corresponding one of the wings to which the support strut is connected, wherein each of the support struts comprises a piston rod connected between the working cylinder and the corresponding one of the wings to which the support strut is attached, and wherein the working cylinder is coupled with a hydraulic motor and an electric motor/generator, so that a movement of the piston rod caused by wing vibrations or wing oscillations drives the hydraulic motor and thus the motor/generator; and
one or more valves in a flow path of the hydraulic fluid, wherein the one or more valves are configured for activation such that a flow resistance for the hydraulic fluid is adjustable.

2. The aircraft according to claim 1, wherein the hydraulic working cylinder is connected to the fuselage.

3. The aircraft according to claim 1, wherein the working cylinder is fixedly attached to the fuselage, and wherein a free end of the piston rod is swivelably connected to the corresponding one of the wings to which the support strut is connected by the piston rod.

4. The aircraft according to claim 1, wherein the working cylinder is produced with a lightweight construction.

5. The aircraft according to claim 4, wherein the working cylinder comprises fiber-reinforced plastic.

6. The aircraft according to claim 1, wherein the motor/generator is configured to, from the movement of the piston rod that drives the hydraulic motor and the motor/generator, generate electricity that can be stored and/or used for operating the aircraft.

* * * * *